United States Patent
Takeda et al.

(10) Patent No.: US 7,436,651 B2
(45) Date of Patent: Oct. 14, 2008

(54) ELECTRIC DOUBLE LAYER CAPACITOR AND ELECTROLYTIC SOLUTION THEREFOR

(75) Inventors: Masayuki Takeda, Mie (JP); Hideo Nagaoka, Mie (JP); Hiroo Miyauchi, Mie (JP); Takeshi Fujino, Saitama (JP); Byoungju Lee, Saitama (JP)

(73) Assignees: Mitsubishi Chemical Corporation, Tokyo (JP); Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 11/474,351

(22) Filed: Jun. 26, 2006

(65) Prior Publication Data

US 2007/0002522 A1    Jan. 4, 2007

(30) Foreign Application Priority Data

Jun. 30, 2005 (JP) ............................. 2005-192208
Jun. 20, 2006 (JP) ............................. 2006-170299

(51) Int. Cl.
    *H01G 9/00* (2006.01)
(52) U.S. Cl. ..................................... 361/502; 252/62.2
(58) Field of Classification Search ................. 361/502; 29/62.2
    See application file for complete search history.

(56) References Cited

U.S. PATENT DOCUMENTS 6,072,692 A * 6/2000 Hiratsuka et al. ........... 361/502
6,190,805 B1 * 2/2001 Takeuchi et al. ............ 429/307
6,198,622 B1 * 3/2001 Nitta et al. .................. 361/504
2006/0092597 A1 * 5/2006 Takeda et al. ............... 361/503

FOREIGN PATENT DOCUMENTS

| JP | 9-275042 | 10/1997 |
|---|---|---|
| JP | 10-121336 | 5/1998 |
| JP | 2001-217150 | 8/2001 |
| JP | 2002-15958 | 1/2002 |
| JP | 2002-134369 | 5/2002 |
| JP | 2004-6803 | 1/2004 |
| JP | 2004-146610 | 5/2004 |

* cited by examiner

*Primary Examiner*—Eric Thomas
(74) *Attorney, Agent, or Firm*—Oblon, Spivak, McClelland, Maier & Neustadt, P.C.

(57) ABSTRACT

The present invention provides an electric double layer capacitor which has electrodes made of an alkali-activated carbon, prepared from a graphitic material, useful in manufacturing high-capacitance capacitors and which has an electrolytic solution containing chain carbonate and/or cyclic carbonate. Even if the electric double layer capacitor is used under high-temperature and high-voltage conditions, chain carbonate and/or cyclic carbonate is prevented from being degraded and the amount of generated gas is slight. The electric double layer capacitor has high initial performance and energy density and the performance of the electric double layer capacitor is maintained high. The electrolytic solution contains a quaternary ammonium salt except for a quaternary ammonium salt containing a carbon atom being bonded to the quaternary nitrogen atom and being bonded to other nitrogen atom than the quaternary nitrogen atom, chain carbonate and/or cyclic carbonate, and a solvent containing a carboxylic ester which contains five or more carbon atoms and which has two or more carboxylic ester bonds.

6 Claims, No Drawings

ELECTRIC DOUBLE LAYER CAPACITOR AND ELECTROLYTIC SOLUTION THEREFOR

FIELD OF THE INVENTION

The present invention relates to an electrolytic solution for electric double layer capacitors and an electric double layer capacitor having the electrolytic solution.

BACKGROUND OF THE INVENTION

Electric double layer capacitors have advantages that the electric double layer capacitors can be used at a wide range of temperatures and have high power density. In order to enhance the energy density of the electric double layer capacitors, it is necessary to increase the working voltage of the electric double layer capacitors. Widely used conventional electrolytic solution is an organic solution (non-aqueous electrolytic solution) which contains chain carbonate or cyclic carbonate as a solvent and a quaternary ammonium salt as a supporting electrolyte. When an electric double layer capacitor including an electrolytic solution containing chain carbonate and/or cyclic carbonate as a principal solvent is used under high voltage conditions, the electric double layer capacitor has various problems such that the electrolytic solution is readily degraded to generate gases.

When a capacitor including electrodes made of an alkali-activated carbon has an electrolytic solution containing chain carbonate and/or cyclic carbonate as a principle solvent, the capacitor has a problem that the solvent is degraded and a large amount of gas is therefore generated if the capacitor is used under high-voltage and high-temperature conditions. That is, a capacitor including such an electrolytic solution is difficult to be used under a high voltage conditions or a high temperature, because the solvent is promoted in degradation thereof to generate decomposed gases including carbon dioxide gas.

In view of an increase in electrical conductivity and/or capacitance change, it has been attempted that various types of solvents or solvent mixtures are used for electrolytic solutions for the electric double layer capacitors. In order to put the electrolytic solutions to practical use, the electrolytic solutions need to meet various physical requirements such as low-temperature properties, ability to dissolve a salt (the dielectric constant of a solvent), safety, degradability, boiling point, and cost. Chain carbonate and cyclic carbonate are examples of a solvent, widely used for the electrolytic solutions, meeting such requirements.

A known example of an electrode material is an activated carbon, prepared by treating a graphitizable carbon material by alkali activation, having high capacity (Japanese Unexamined Patent Application Publication No. 09-275042). However, a capacitor having an electrode made of the above activated carbon has a lot of defects when composing cells thereof, because the above activated carbon generates more gases due to degradation of a solvent than a steam-activated carbon. In particular, when a capacitor including electrodes made of an alkali-activated carbon has an electrolytic solution containing a carbonate solvent, the capacitor has a problem that the solvent is degraded and $CO_2$ of gas is therefore generated if the capacitor is used under high-voltage and high-temperature conditions.

Examples of a technique for preventing decomposition gases, such as carbon dioxide, include a technique using an electrolytic solution, containing a solvent containing γ-butyrolactone or γ-valerolactone, for capacitors (Japanese Unexamined Patent Application Publication No. 2001-217150); a technique using an electrolytic solution containing fluorobenzene (Japanese Unexamined Patent Application Publication No. 2004-6803); and a technique using an electrolytic solution containing diphenyl (Japanese Unexamined Patent Application Publication No. 2004-146610).

In an electric double layer capacitor including electrodes made of an alkali-activated carbon prepared from a graphitic material, the above techniques are ineffective in preventing gas from being generated due to the degradation of an electrolytic solution.

SUMMARY OF THE INVENTION

It is an object of the present invention to provide an electric double layer capacitor which has electrodes made of an alkali-activated carbon, prepared from a graphitic material, useful in manufacturing high-capacitance capacitors and which has an electrolytic solution containing chain carbonate and/or cyclic carbonate. Even if the electric double layer capacitor is used under high-temperature and high-voltage conditions, the chain carbonate and/or cyclic carbonate is/are prevented from being degraded and the amount of generated gas is slight. The electric double layer capacitor has high initial performance and energy density and the performance of the electric double layer capacitor is maintained high.

An electrolytic solution according to the present invention is used for electric double layer capacitors including electrodes made of an alkali-activated carbon prepared from a graphitic material. The electrolytic solution contains chain carbonate and/or cyclic carbonate, a carboxylic ester which contains five or more carbon atoms and which has two or more carboxylic ester bonds, and a quaternary ammonium salt except for a quaternary ammonium salt containing a carbon atom being bonded to the quaternary nitrogen atom and being bonded to other nitrogen atom than the quaternary nitrogen atom.

An electric double layer capacitor according to the present invention has a pair of electrodes and the above electrolytic solution. The electrodes are made of an alkali-activated carbon prepared from a graphitic material and the electrolytic solution is present between the electrodes.

DETAILED DESCRIPTION

An electrolytic solution according to the present invention is used for electric double layer capacitors including electrodes made of an alkali-activated carbon prepared from a graphitic material. The electrolytic solution contains chain carbonate and/or cyclic carbonate, a carboxylic ester which contains five or more carbon atoms and which has two or more carboxylic ester bonds, and a quaternary ammonium salt except for a quaternary ammonium salt containing a carbon atom being bonded to the quaternary nitrogen atom and being bonded to other nitrogen atom than the quaternary nitrogen atom.

The carboxylic ester may be a type of dicarboxylic ester.

The electrolytic solution may contain 12 to 40 weight percent of the carboxylic ester to all solvents in the electrolytic solution.

The quaternary ammonium salt may be a type of tetraalkylammonium salt having two or more different alkyl groups and/or a type of cyclic quaternary ammonium salt.

The quaternary ammonium salt may be a tetrafluoroborate.

An electric double layer capacitor according to the present invention has electrodes made of an alkali-activated carbon prepared from a graphitic material and the electrolytic solution.

The electrolytic solution of the present invention is reduced in gas generation due to degradation of the solvent comprising chain carbonate and/or cyclic carbonate, even when the electrodes are made of the alkali-activated carbon. Hence, the electric double layer capacitor has high initial performance and high energy density and the performance thereof can be maintained high. When the carboxylic ester which contains at least five carbon atoms and which has at least two carboxylic ester bonds is a type of dicarboxylic ester, the capacity of the capacitor is enlarged. When the electrolytic solution contains 12 to 40 weight percent of the carboxylic ester to all solvents in the electrolytic solution, gas is prevented to be generated; electrolyte is prevented in precipitation thereof; and the capacitor is prevented is lowering characteristics at a low temperature.

The mechanism of preventing gas from being generated the electric double layer capacitor is not clear but is probably as described below.

A larger number of hydrogen ions are produced in the alkali-activated carbon, which is prepared from the graphitic material, by the hydrolysis of $BF_4^-$ ions derived from a supporting electrolyte contained in the electrolytic solution as compared to a steam-activated carbon; hence, chain carbonate and/or cyclic carbonate in the electrolytic solution is readily degraded. This is probably because water molecules remaining on the alkali-activated carbon react with the $BF_4^-$ ions, attracted to the alkali-activated carbon during charge, at reaction sites on the alkali-activated carbon to produce a small amount of HF, which renders internal portions of the alkali-activated carbon acidic; hence, the electrochemical oxidative degradation of chain carbonate and/or cyclic carbonate proceeds at a high rate.

The reason why the carboxylic ester which contains five or more carbon atoms and which has two or more carboxylic ester bonds used herein functions effectively under such conditions is probably as follows: molecules of the carboxylic ester are preferentially adsorbed on the alkali-activated carbon to block the reaction sites, at which the water molecules react with the $BF_4^-$ ions, or even if the water molecules react with the $BF_4^-$ ions to produce HF, the carboxylic ester which contains five or more carbon atoms and which has two or more carboxylic ester bonds is more preferentially consumed than the chain carbonate and/or cyclic carbonate, that is, the carboxylic ester preferentially reacts with HF, whereby the degradation of chain carbonate and/or cyclic carbonate is prevented. This leads to a reduction in the amount of generated gas.

The reason why the alkali-activated carbon, which is prepared from the graphitic material, has such an advantage is probably that since the alkali-activated carbon has a large number of edge faces, a large number of the water molecules adsorbed on the alkali-activated carbon cannot be desorbed therefrom by drying; hence, the adsorbed water molecules react readily with the $BF_4^-$ ions.

Examples of chain carbonate and/or cyclic carbonate include ethylene carbonate, propylene carbonate, butylene carbonate, dimethyl carbonate, ethyl methyl carbonate, and diethyl carbonate.

The carboxylic ester is effective in enhancing the capacitance, the durability, and low-temperature properties of the electric double layer capacitor.

The electrolytic solution and electric double layer capacitor according to the present invention will now be further described in detail.

The electric double layer capacitor has the electrodes and the electrolytic solution which contains chain carbonate and/or cyclic carbonate, a carboxylic ester which contains five or more carbon atoms and which has two or more carboxylic ester bonds, and a quaternary ammonium salt except for a quaternary ammonium salt containing a carbon atom being bonded to the quaternary nitrogen atom and being bonded to other nitrogen atom than the quaternary nitrogen atom.

[Activated Carbon Electrode]

The electrodes included in the electric double layer capacitor contains the alkali-activated carbon prepared from the graphitic material as the electrode material.

Preferable examples of a carbonaceous material for producing the graphitic material include mesophase pitch, distillated petroleum pitch, distillated coal pitch, coke produced from petroleum or coal pitch, needle coke, chemically synthesized pitch, and PVC pitch. These carbonaceous materials may be used alone or in combination. Examples of a method for producing the alkali-activated carbon include methods disclosed in, for example, Japanese Unexamined Patent Application Publication Nos. 2002-15958, 2002-134369, 09-275042, and 10-121336. These documents are incorporated herein by reference.

In particular, the carbonaceous material is carbonized at 700° C. for one hour in a nitrogen atmosphere and then pulverized, whereby the graphitic material is prepared. The graphitic material is activated using solid potassium hydroxide in such a manner that the graphitic material is treated at 400° C. for three hours and then at 750° C. for three hours in a nitrogen atmosphere. The resulting graphitic material is sufficiently cleaned, whereby the alkali-activated carbon is prepared.

The electrodes included in the electric double layer capacitor can be prepared in such a manner that the alkali-activated carbon, a conductive filler, and a binder are mixed at a predetermined ratio by an ordinary method and the mixture is rolled into sheets for manufacturing the electrodes.

The alkali-activated carbon preferably has a large number of pores and a relatively small specific surface area. In particular, the alkali-activated carbon preferably has a specific surface area specific of 2500 $m^2/g$ or less, more preferably 2000 $m^2/g$ or less, and further more preferably 1000 $m^2/g$ or less. This is because the number of the adsorbed water molecules is large and the carboxylic ester securely prevents the degradation of the carbonate solvent. However, if the specific surface area of the alkali-activated carbon is extremely small, a voltage higher than or equal to 3.0 V must be applied to the electric double layer capacitor in order to achieve high capacitance. Since applying high voltage to the electric double layer capacitor damages the electrolytic solution, the alkali-activated carbon preferably has a specific surface area of 100 $m^2/g$ or more and more preferably 300 $m^2/g$ or more.

The alkali-activated carbon preferably has a pore volume of 0.05 to 1.2 ml/g. When the alkali-activated carbon has an extremely large number of surface functional groups, the amount of remaining water is large. This causes the degradation of the electrolytic solution. Hence, the number of the surface functional groups is preferably 0.01 to 1.0 meq/g.

The specific surface area of the alkali-activated carbon can be determined in such a manner that about 0.5 g of the alkali-activated carbon is vacuum-treated at 300° C. for six hours and then measured by a nitrogen adsorption method. The total volume of pores, having a diameter of 2 nm or less, present in the alkali-activated carbon can be determined by "the t-plot method" (B. C. Lippens and J. H. de Boer, J. Catalysis, 4, 319 (1965)). The number of the surface functional groups can be determined by a known method (see, for example, Hyomen, vol. 34, No. 2 (1996) or catal. 16, 179 (1966)). In particular, the number thereof is determined as follows: 2 g of the alkali-activated carbon is placed in a 100 ml Erlenmeyer flask; 50 ml of N/10 sodium ethoxide, which is an alkali reagent, is added to the alkali-activated carbon; the Erlenmeyer flask is shaken for 24 hours; the mixture is filtrated; and the resulting alkali reagent is titrated with N/10 hydrochloric acid. The content of an alkali metal in the alkali-activated carbon can be determined in such a manner that 20 g or more of the alkali-activated carbon is fired at 700° C. or less for 24 hours or more, the resulting ash is dissolved in distilled water, and the solution is analyzed by atomic absorption spectroscopy.

[Electrolytic Solution]

The electrolytic solution contains chain carbonate and/or cyclic carbonate, a carboxylic ester which contains five or more carbon atoms and which has two or more carboxylic ester bonds, and a quaternary ammonium salt except for a quaternary ammonium salt containing a carbon atom being bonded to the quaternary nitrogen atom and being bonded to other nitrogen atom than the quaternary nitrogen atom. The carboxylic ester which contains at least five carbon atoms and which has at least two carboxylic ester bonds is preferably a type of dicarboxylic ester, and the electrolytic solution preferably contains 12 to 40 weight percent of the carboxylic ester to all solvents in the electrolyte solution.

1) Quaternary Ammonium Salt

The quaternary ammonium salt used in the present invention is a quaternary ammonium salt except for a quaternary ammonium salt containing a carbon atom being bonded to the quaternary nitrogen atom and being bonded to other nitrogen atom than the quaternary nitrogen atom. When the carbon atom bonded to the quaternary nitrogen atom of the quaternary ammonium salt is further bonded to other nitrogen atom than the quaternary nitrogen atom, the bond between the carbon atom and the nitrogen atom other than the quaternary nitrogen atom is low in electrochemical stability and susceptible to degradation, which leads to a decrease in durability and is ineffective in preventing gas from being generated in the electric double layer capacitor.

Preferable examples of a quaternary ammonium that is the cation of the quaternary ammonium salt include ammoniums below.

i) Tetraalkylammonium

The following tetraalkylammonium is a preferable example of the quaternary ammonium: a tetraalkylammonium with alkyl groups that preferably have one to 12 carbon atoms and more preferably one to two carbon atoms. Examples of the tetraalkylammonium include tetramethylammonium, ethyltrimethylammonium, diethyldimethylammonium, triethylmethylammonium, tetraethylammonium, trimethyl-n-propylammonium, trimethylisopropylammonium, trimethyl-n-butylammonium, trimethylisobutylammonium, trimethyl-t-butylammonium, trimethyl-n-hexylammonium, dimethyldi-n-propylammonium, dimethyldiisopropylammonium, dimethyl-n-propylisopropylammonium, methyltri-n-propylammonium, methyltriisopropylammonium, methyldi-n-propylisopropylammonium, methyl-n-propyldiisopropylammonium, triethyl-n-propylammonium, triethylisopropylammonium, triethyl-n-butylammonium, triethylisobutylammonium, triethyl-t-butylammonium, dimethyldi-n-butylammonium, dimethyldiisobutylammonium, dimethyldi-t-butylammonium, dimethyl-n-butylethylammonium, dimethylisobutylethylammonium, dimethyl-t-butylethylammonium, dimethyl-n-butylisobutylammonium, dimethyl-n-butyl-t-butylammonium, dimethylisobutyl-t-butylammonium, diethyldi-n-propylammonium, diethyldiisopropylammonium, diethyl-n-propylisopropylammonium, ethyltri-n-propylammonium, ethyltriisopropylammonium, ethyldi-n-propylisbpropylammonium, ethyl-n-propyldiisopropylammonium, diethylmethyl-n-propylammonium, ethyldimethyl-n-propylammonium, ethylmethyldi-n-propylammonium, diethylmethylisopropylammonium, ethyldimethylisopropylammonium, ethylmethyldiisopropylammonium, ethylmethyl-n-propylisopropylammonium, tetra-n-propylammonium, tetraisopropylammonium, n-propyltriisopropylammonium, di-n-propyldiisopropylammonium, tri-n-propylisopropylammonium, trimethylbutylammonium, trimethylpentylammonium, trimethylhexylammonium, trimethylheptylammonium, trimethyloctylammonium, tetra-n-butylammonium, trimethylnonylammonium, trimethyldecylammonium, trimethylundecylammonium, trimethyldodecylammonium, and N,N-diethyl-N-methyl-N-(2-methoxyethyl)ammonium.

Among these ammoniums, tetraalkylammoniums with two or more different alkyl groups are preferable, and triethylmethylammonium, diethyldimethylammonium, and ethyltrimethylammonium are more preferable, since they have high solubility to a solvent and provide an electrolyte having high conductivity.

ii) Aromatic Ammonium

The following ammonium is another preferable example of the quaternary ammonium: an aromatic ammonium having one to four aromatic groups such as phenyl groups and zero to three alkyl groups with one to 12 carbon atoms. Examples of the aromatic ammonium include trimethylphenylammonium and tetraphenylammonium.

iii) Alicyclic Ammonium

The following ammonium is another preferable example of the quaternary ammonium: an alicyclic ammonium that has a cycloalkane structure containing a single quaternary nitrogen atom or a spiro structure in which two cycloalkane rings share a single quaternary nitrogen atom. Examples of the alicyclic ammonium include pyrrolidiniums such as N,N-dimethylpyrrolidinium, N-ethyl-N-methylpyrrolidinium, N,N-diethylpyrrolidinium, and N,N-tetramethylenepyrrolidinium; piperidiniums such as N,N-dimethylpiperidinium, N-ethyl-N-methylpiperidinium, N,N-diethylpiperidinium, N,N-tetramethylenepiperidinium, and N,N-pentamethylenepiperidinium; and morpholiniums such as N,N-dimethylmorpholinium, N-ethyl-N-methylmorpholinium, and N,N-diethyl morpholinium. Among them, pyrrolidiniums are preferable, and N-ethyl-N-methylpyrrolidinium and N,N-tetramethylenepyrrolidinium are more preferable since they have high solubility to a solvent and provide an electrolyte having high conductivity.

Examples of the anion of the quaternary ammonium salt include anions derived from fluorine-containing inorganic anions such as tetrafluoroboric acid, hexafluorophosphoric acid, hexafluoroarsenic acid, hexafluoroantimonic acid, hexafluoroniobic acid, hexafluorotantalic acid, and tetrafluoroaluminic acid; anions derived from trifluoromethanesulfonic acid, perchloric acid, bis(trifluoromethanesulfonyl)imide, bis(pentafluoroethanesulfonyl)imide, tris(trifluoromethanesulfonyl)methide, perfluoroalkyl borates, perfluoroalkyl phosphates, and bis(oxalato)borate; and other anions. Among these anions, the anion derived from tetrafluoroboric acid is particularly preferable.

These quaternary ammonium salts may be used alone or in combination.

Since the supporting electrolyte contained in the electrolytic solution needs to be highly pure, the quaternary ammonium salt is purified to a desired purity by recrystallization or solvent extraction as required.

The content of the quaternary ammonium salt in the electrolytic solution is preferably in the range that the number of ions is sufficient to form an electric double layer and sufficient to achieve necessary electrical conductivity. The lower limit of the quaternary ammonium salt content is preferably 0.4 mol/L or more and more preferably 0.8 mol/L or more. Since an increase in the quaternary ammonium salt content may cause the precipitation of the supporting electrolyte at a low temperature, the upper limit thereof is preferably 6 mol/L or less and more preferably 2.5 mol/L or less and yet more preferably 2 mol/L or less.

2) Chain Carbonate and Cyclic Carbonate

The organic electrolytic solution of the present invention contains chain carbonate and/or cyclic carbonate. Examples of the chain carbonate include dimethyl carbonate, ethyl methyl carbonate, and diethyl carbonate, and examples of cyclic carbonates include ethylene carbonate, propylene carbonate, 2,3-dimethylethylene carbonate, and butylene carbonate.

In the present invention, a carbonate with three to five carbon atoms is preferable among the carbonates. In particular, the following carbonates are more preferable: propylene carbonate, ethylene carbonate, butylene carbonate, dimethyl carbonate, ethyl methyl carbonate, or diethyl carbonate. Propylene carbonate is particularly preferable. These carbonates may be used alone or in combination.

In order to achieve good properties due to the use of the carbonate and in order to achieve the effect of preventing the generation of gas, the effect being characteristic of the present invention, the content of the carbonate in the total solvent is preferably 50 weight percent or more and more preferably 80 weight percent or more.

3) Carboxylic Ester

The carboxylic ester used herein preferably has five or more carbon atoms and two or more carboxylic ester bonds. When the carboxylic ester has four or less carbon atoms, the carboxylic ester is low in electrochemical stability and the leakage current of the electric double layer capacitor is large. This is not preferable. The upper limit of the number of carbon atoms in the carboxylic ester is not particularly limited. In view of the compatibility with the chain carbonate and/or cyclic carbonate, the carboxylic ester preferably has ten or less carbon atoms and more preferably eight or less carbon atoms.

The number of the carboxylic ester bonds in the carboxylic ester is two or more as described above. When the carboxylic ester has one carboxylic ester bond, the effect of preventing the gas generation can hardly be achieved. This is not preferable. Since an increase in the number of the carboxylic ester bonds leads to an increase in the viscosity of the carboxylic ester, the number of the carboxylic ester bonds is preferably two. In view of the effect of preventing the gas generation, a dicarboxylic ester is preferable.

Examples of the carboxylic ester include dimethyl malonate, ethyl methyl malonate, diethyl malonate, dimethyl methylmalonate, ethyl methyl methylmalonate, diethyl methylmalonate, dimethyl dimethylmalonate, ethyl methyl dimethylmalonate, diethyl dimethylmalonate, dimethyl succinate, ethyl methyl succinate, diethyl succinate, dimethyl 2-methylsuccinate, ethyl methyl 2-methylsuccinate, dimethyl glutarate, ethyl methyl glutarate, diethyl glutarate, dimethyl 2-methylglutarate, ethyl methyl 2-methylglutarate, diethyl 2-methylglutarate, dimethyl adipate, ethyl methyl adipate, diethyl adipate, 1,2-diacetoxyethane, 1,2-diacetoxypropane, 1,4-diacetoxybutane, glycerin triacetate, methyl 4-acetoxybutyrate, and methyl 2-acetoxyisobutyrate. The following esters are preferable: dimethyl malonate, ethyl methyl malonate, diethyl malonate, dimethyl succinate, ethyl methyl succinate, diethyl succinate, dimethyl 2-methylsuccinate, dimethyl glutarate, and dimethyl adipate. The following esters are more preferable: dimethyl malonate, ethyl methyl malonate, dimethyl succinate, and ethyl methyl succinate.

These esters may be used alone or in combination.

The content of the carboxylic ester to all solvents in the electrolytic solution is preferably 50 weight percent or less and more preferably 40 weight percent or less. When the carboxylic ester content exceeds 50 weight percent, there is a problem in that an electrolytic salt precipitates and/or low-temperature properties are deteriorated. This is not preferable for practical use. The lower limit of the carboxylic ester content is not particularly limited and the carboxylic ester content is preferably 5 weight percent or more, more preferably 12 weight percent or more, and yet more preferably 15 weight percent or more. When the carboxylic ester content is less than five weight percent, the effect of preventing the gas generation is insufficient. This is not preferable.

4) Other Aprotic Solvent

The electrolyte of the present invention may further contain other aprotic solvent than the above carboxylic ester. Examples of such aprotic solvent includes chain or cyclic carboxylic esters (for example, methyl formate, methyl acetate, methyl propionate, ethyl acetate, propyl acetate, butyl acetate, and amyl acetate, γ-butyrolactone, γ-valerolactone, and δ-valerolactone); phosphoric esters (such as trimethyl phosphate, ethyl dimethyl phosphate, diethyl methyl phosphate, and triethyl phosphate); nitriles (such as acetonitrile, propionitrile, methoxyacetonitrile, methoxypropionitrile, glutaronitrile, adiponitrile, and 2-methylglutaronitrile); and sulfones (such as dimethyl sulfone, ethyl methyl sulfone, diethyl sulfone, sulfolane, 3-methylsulfolane, and 2,4-dimethylsulfolane.

The content of the above aprotic solvent to all solvent in the electrolyte to preferably 50 weight percent or less, but not limitative thereto.

5) Additive

The electrolytic solution may further contain an additive. In view of properties of the electric double layer capacitor, it is necessary that the additive itself has a high dielectric strength, has no adverse effects on the properties thereof, and generates no gas when the additive is degraded. The electrolytic solution may contain two or more types of additives.

If the electrolytic solution contains, for example, cyclohexane or cyclopentane serving as an additive adsorptive on the alkali-activated carbon, a synergetic effect can be achieved. The additive creates a stable product on the alkali-activated carbon to prevent the continuous degradation of chain carbonate and/or cyclic carbonate and is preferentially adsorbed on the alkali-activated carbon to prevent the degradation of chain carbonate and/or cyclic carbonate which is the principal solvent.

The content of the additive in the electrolytic solution depends on properties of the additive and is preferably 50 weight percent or less and more preferably about 12 to 50 weight percent for practical use. When the additive content is 12 weight percent or more, a remarkable advantage can be obtained. However, if the additive content exceeds 50 weight percent, the carbonate is separated from the electrolytic solution; hence, the electrolytic solution cannot be kept uniform. Furthermore, since a decrease in temperature decreases the solubility of the quaternary ammonium salt in the electrolytic solution, an extreme increase in the additive content can cause the precipitation or separation of the quaternary ammonium salt. This causes a decrease in ionic conductivity.

It is preferable for practical use that the additive be not separated from the electrolytic solution but be dissolved or dispersed in the electrolytic solution. However, if the additive is not dissolved or dispersed therein, the effect of preventing the gas generation can be achieved.

The additive need not be directly mixed with the electrolytic solution but may be added to the electrolytic solution in such a manner that the vapor of the additive is adsorbed on the alkali-activated carbon and a cell is prepared using the resulting alkali-activated carbon and then impregnated with the electrolytic solution.

6) Water

A slight amount of water may be present in the electrolytic solution. Since the presence of water increases the internal resistance and/or leakage current of the electric double layer capacitor, the amount of water therein is preferably small. The amount of water therein is preferably 50 ppm or less and more preferably 30 ppm or less for practical use.

[Electric Double-Layer Capacitor]

The electric double layer capacitor is cylindrical and may have a case, made of aluminum, having a diameter of 40 mm and a length of 120 mm; an electrode roll; and the electrolytic solution. The electrode roll is an element prepared in such a manner that activated-carbon sheets are attached to both faces of a strip-shaped current collector including an aluminum foil with a conductive adhesive so as to serve as a positive electrode or a negative electrode, a separator is stacked on one of the activated-carbon sheets, and the stack is rolled. The element is placed into the aluminum case such that no gap exists therebetween, the aluminum case is sealed by welding a terminal section of the aluminum case, and the electrolytic solution is injected into the aluminum case through an injection port thereof. The element can be readily prepared so as to have a desired size by adjusting the width and/or length of the electrodes. The density of the electrodes in the element can be increased by tightly rolling the stack. This leads to an increase in the filling factor of the alkali-activated carbon.

The cell structure of the electric double layer capacitor is not particularly limited. Cubic or parallelepiped cells each including stacked electrodes may be used. A capacitor module including such cells has a volume efficiency greater than that of a cylindrical electric double layer capacitor.

The case containing the element need not necessarily be made of aluminum but may be made of an alloy having a volume change of 1% or less due to charge or discharge. The alloy contains, but is not limited to, at least one selected from the group consisting of Al, Ti, Mg, Fe, Cr, Ni, Mn, Co, and Zr.

EXAMPLES AND COMPARATIVE EXAMPLES

The present invention will now be further described in detail in connection with examples and comparative examples.

Example 1

A carbonaceous material (for example, a material obtained by a method disclosed in Japanese Unexamined Patent Application Publication No. 2002-134369) was carbonized at 700° C. for one hour in a nitrogen atmosphere and then pulverized, whereby a graphitic material was prepared. The graphitic material was treated at 400° C. for three hours and then at 750° C. for three hours in a nitrogen atmosphere using potassium hydroxide, whereby the graphitic material was alkali-activated. The resulting graphitic material was sufficiently cleaned, whereby an alkali-activated carbon was prepared. The alkali-activated carbon had a specific surface area of 790 $m^2/g$, a pore volume of 0.34 ml/g, a potassium content of 200 ppm, and an average particle size of 10 µm, the pore volume being determined by measuring micropores in the alkali-activated carbon by the t-plot method. The number of surface functional groups on the alkali-activated carbon was determined by titration and was 0.7 meq/g.

The alkali-activated carbon, acetylene black (a conductive additive), and polytetrafluoroethylene (a binder) were weighed such that the ratio of the alkali-activated carbon, acetylene black, and polytetrafluoroethylene was 90:5:5 on a weight basis. These materials were mixed and the mixture was rolled, whereby activated-carbon sheets having a density of 0.8 $g/cm^3$ and a thickness of 140 µm were prepared.

An electrolyte solution was prepared by dissolving triethyl methyl ammonium tetrafluoroborate in a propylene carbonate solution containing 3 weight percent dimethyl succinate such that the final concentration of triethyl methyl ammonium tetrafluoroborate $((C_2H_5)_3(CH_3)NBF_4)$ in the solution was 1.7 mol/L. A prepared electrolytic solution had a water content of 30 ppm or less.

The activated-carbon sheets were attached to both faces of a strip-shaped current collector including an aluminum foil with a conductive adhesive so as to serve as a positive electrode or a negative electrode, a separator was stacked on one of the activated-carbon sheets, and the stack was rolled, whereby an element was prepared. The element was placed into an aluminum case having a diameter of 40 mm and a length of 120 mm such that no gap exists therebetween. The aluminum case was sealed by welding a terminal section of the aluminum case. The electrolytic solution is injected into the aluminum case through an injection port thereof, whereby an electric double layer capacitor having a cylindrical shape was prepared.

Example 2

An electric double layer capacitor was prepared in the same manner as that described in Example 1 except that a solvent containing six weight percent dimethyl succinate was used in the same step as one of the steps described in Example 1.

Example 3

An electric double layer capacitor was prepared in the same manner as that described in Example 1 except that a solvent containing 12 weight percent dimethyl succinate was used in the same step as one of the steps described in Example 1.

Example 4

An electric double layer capacitor was prepared in the same manner as that described in Example 1 except that a solvent containing 20 weight percent dimethyl succinate was used in the same step as one of the steps described in Example 1.

Example 5

An electric double layer capacitor was prepared in the same manner as that described in Example 1 except that a solvent containing 40 weight percent dimethyl succinate was used in the same step as one of the steps described in Example 1.

Example 6

An electric double layer capacitor was prepared in the same manner as that described in Example 1 except that a solvent containing dimethyl malonate at a content of 12 weight percent was used instead of the solvent containing 3 weight percent of dimethyl succinate in the same step as one of the steps described in Example 1.

Example 7

An electric double layer capacitor was prepared in the same manner as that described in Example 6 except that a solvent containing dimethyl malonate at a content of 20 weight percent was used instead of the solvent in the same step as one of the steps described in Example 6.

Example 8

An electric double layer capacitor was prepared in the same manner as that described in Example 6 except that a solvent containing dimethyl malonate at a content of 40 weight percent was used instead of the solvent in the same step as one of the steps described in Example 6.

Comparative Example 1

An electric double layer capacitor was prepared in the same manner as that described in Example 1 except that the following solution was used instead of the electrolytic solution in the same step as one of the steps described in Example 1: a propylene carbonate solution containing no dimethyl succinate but 1.7 mol/L triethyl methyl ammonium tetrafluoroborate $((C_2H_5)_3(CH_3)NBF_4)$

Comparative Example 2

An electric double layer capacitor was prepared in the same manner as that described in Comparative Example 1 except that a steam-activated carbon (BP20, available from Kuraray Chemical Co., Ltd.) was used instead of the alkali-activated carbon in the same step as one of the steps described in Comparative Example 1.

Comparative Example 3

An electric double layer capacitor was prepared in the same manner as that described in Example 3 except that a steam-activated carbon (BP20, available from Kuraray Chemical Co., Ltd.) was used instead of the alkali-activated carbon in the same step as one of the steps described in Example 3.

Comparative Example 4

An electric double layer capacitor was prepared in the same manner as that described in Comparative Example 1 except that 1-ethyl-3-methylimidazolium tetrafluoroborate $(C_3H_3N_2(C_2H_5)(CH_3)BF_4)$ was used instead of triethyl methyl ammonium tetrafluoroborate in the same step as one of the steps described in Comparative Example 1.

Comparative Example 5

An electric double layer capacitor was prepared in the same manner as that described in Example 3 except that 1-ethyl-3-methylimidazolium tetrafluoroborate $(C_3H_3N_2(C_2H_5)(CH_3)BF_4)$ was used instead of triethyl methyl ammonium tetrafluoroborate in the same step as one of the steps described in Example 3.

Comparative Example 6

An electric double layer capacitor was prepared in the same manner as that described in Example 1 except that a solvent containing methyl propionate at a content of 12 weight percent was used instead of the solvent in the same step as one of the steps described in Example 1.

Comparative Example 7

An electric double layer capacitor was prepared in the same manner as that described in Comparative Example 6 except that a solvent containing methyl propionate at a content of 20 weight percent was used instead of the solvent in the same step as one of the steps described in Comparative Example 6.

[Evaluation]

1) Capacitance

A voltage of 2.7 V was applied to each of the electric double layer capacitors, prepared in Examples 1 to 8 and Comparative Examples 1 to 7, at 65° C. for six hours, whereby the electric double layer capacitors were aged. The resulting electric double layer capacitors were constantly discharged at a current of 30 A at 25° C., whereby the electric double layer capacitors were measured for initial characteristics. The electric double layer capacitors were then subjected to an accelerated durability test in such a manner that the electric double layer capacitors were kept in a constant-temperature bath at 65° C. for 1000 hours while a voltage of 2.7 V was being applied to each electric double layer capacitor. After the durability test was finished, the resulting cells was cooled to 25° C. and then determined for capacitance by energy conversion, whereby a capacitance maintenance rate (the percentage (percent) of the initial capacitance of each electric double layer capacitor to the capacitance of the electric double layer capacitor subjected to the accelerated durability test for 1000 hours) was detected. The results are shown in Table 1.

2) Amount of Generated Gas

The pressure in each cell was increased because gas was generated by the degradation of the electrolytic solution in the cell during the durability test. The amount of the gas was determined in such a manner that the gas was withdrawn from the cell with a syringe until the pressure in the cell was reduced to atmospheric pressure. The amounts of gases generated from the cells prepared in Examples 1 to 8 were normalized by the amount of gas generated from the cell prepared in Comparative Example 1. The amount of gas generated from the cell prepared in Comparative Example 3 was normalized by the amount of gas generated from the cell prepared in Comparative Example 2. The amount of gas generated from the cell prepared in Comparative Example 5 was normalized by the amount of gas generated from the cell prepared in Comparative Example 4. The amount of gas generated from the cell prepared in Comparative Example 7 was normalized by the amount of gas generated from the cell prepared in Comparative Example 6. The results are also shown in Table 1.

TABLE 1

| Examples | Electrolytic Solutions | | | Activated Carbons | Capacitance | | | Generated Gas | |
|---|---|---|---|---|---|---|---|---|---|
| | Carboxylic Esters | | Quaternary Ammonium Salts | | Initial Capacitance F | 1000 Hours Elapse | | Amount of Gas (cm³) | Index |
| | Type | Content (wt %) | | | | Capacitance F | Capacitance Maintenance Rate (%) | | |
| Example 1 | Dimethyl Succinate | 3 | (C₂H₅)₃(CH₃)NBF₄ | Alkali-activated Carbon | 1920 | 1670 | 87 | 47 | 0.98 |
| Example 2 | Dimethyl Succinate | 6 | (C₂H₅)₃(CH₃)NBF₄ | Alkali-activated Carbon | 1920 | 1670 | 87 | 46 | 0.96 |
| Example 3 | Dimethyl Succinate | 12 | (C₂H₅)₃(CH₃)NBF₄ | Alkali-activated Carbon | 1915 | 1745 | 91 | 35 | 0.73 |
| Example 4 | Dimethyl Succinate | 20 | (C₂H₅)₃(CH₃)NBF₄ | Alkali-activated Carbon | 1925 | 1790 | 93 | 27 | 0.56 |
| Example 5 | Dimethyl Succinate | 40 | (C₂H₅)₃(CH₃)NBF₄ | Alkali-activated Carbon | 1925 | 1806 | 94 | 24 | 0.50 |
| Example 6 | Dimethyl Malonate | 12 | (C₂H₅)₃(CH₃)NBF₄ | Alkali-activated Carbon | 1920 | 1730 | 90 | 40 | 0.83 |
| Example 7 | Dimethyl Malonate | 20 | (C₂H₅)₃(CH₃)NBF₄ | Alkali-activated Carbon | 1928 | 1782 | 92 | 31 | 0.65 |
| Example 8 | Dimethyl Malonate | 40 | (C₂H₅)₃(CH₃)NBF₄ | Alkali-activated Carbon | 1928 | 1774 | 92 | 25 | 0.52 |
| Comparative Example 1 | — | — | (C₂H₅)₃(CH₃)NBF₄ | Alkali-activated Carbon | 1920 | 1670 | 87 | 48 | 1.00 |
| Comparative Example 2 | — | — | (C₂H₅)₃(CH₃)NBF₄ | Steam-activated Carbon | 1248 | 1111 | 89 | 28 | 1.00 |
| Comparative Example 3 | Dimethyl Succinate | 12 | (C₂H₅)₃(CH₃)NBF₄ | Steam-activated Carbon | 1250 | 1125 | 90 | 26 | 0.93 |
| Comparative Example 4 | — | — | C₃H₃N₂(C₂H₅)(CH₃)BF₄ | Alkali-activated Carbon | 1980 | 1627 | 82 | 48 | 1.00 |
| Comparative Example 5 | Dimethyl Succinate | 12 | C₃H₃N₂(C₂H₅)(CH₃)BF₄ | Alkali-activated Carbon | 2035 | 1710 | 84 | 48 | 1.00 |
| Comparative Example 6 | Methyl Propionate | 12 | (C₂H₅)₃(CH₃)NBF₄ | Alkali-activated Carbon | 1920 | 1701 | 89 | 46 | 1.00 |
| Comparative Example 7 | Methyl Propionate | 20 | (C₂H₅)₃(CH₃)NBF₄ | Alkali-activated Carbon | 1900 | 1712 | 90 | 46 | 1.00 |

Facts below are clear from Table 1.

The electric double layer capacitors which were prepared in Examples 1 to 8 and then subjected to the durability test for 1000 hours have a capacitance maintenance rate greater than or equal to that of the electric double layer capacitor which was prepared in Comparative Example 1 and then subjected to the durability test for 1000 hours and which contains no carboxylic ester specified herein. The amounts of gases generated from the following capacitors are small: the electric double layer capacitors containing five weight percent or more of the carboxylic esters. In particular, those from the electric double layer capacitors, prepared in Examples 3 to 8, containing 12 weight percent or more of the carboxylic esters are remarkably small.

In contrast, the amounts of gases generated from the following capacitors are large: the electric double layer capacitor, prepared in Comparative Example 1, containing no carboxylic ester specified herein and the electric double layer capacitors, prepared in Comparative Examples 6 and 7, containing methyl propionate that has four carbon atoms and one carboxylic ester bond.

The electric double layer capacitors of Comparative Examples 2 and 3 using the steam-activated carbon have a capacitance less than those of the electric double layer capacitors (Comparative Examples 1 and Example 3) using the alkali-activated carbon.

The electric double layer capacitors of Comparative Examples 4 and 5 used the imidazolium salt having a carbon atom bonded not only to the quaternary nitrogen atoms but also to other nitrogen atom. Hence the capacitances of these electric double layer capacitors are seriously reduced by the durability test, which is not preferable. This is because imidazolium ions are reductively degraded, which causes a decrease in the capacities of the negative electrodes of these electric double layer capacitors.

The present invention is as described above in connection with the embodiments. It is apparent to those skilled in the art that various modifications may be made within the scope of the present invention.

This application is based on a Japanese patent application (Japanese Patent Application No. 2005-192208), filed on Jun. 30, 2005 and a Japanese patent application (Japanese Patent Application No. 2006-170299), filed on Jun. 20, 2006, the disclosure of which are incorporated herein by reference.

What it claimed is:

1. An electrolytic solution used for electric double layer capacitors including electrodes made of an alkali-activated carbon prepared from a graphitic material, said electrolytic solution comprising:
   at least one of chain carbonate and cyclic carbonate;
   a carboxylic ester which contains at least five carbon atoms and which has at least two carboxylic ester bonds; and
   a quaternary ammonium salt except for a quaternary ammonium salt containing a carbon atom being bonded to the quaternary nitrogen atom and being bonded to other nitrogen atom than the quaternary nitrogen atom.

2. The electrolytic solution according to claim 1, wherein the carboxylic ester is a type of dicarboxylic ester.

3. The electrolytic solution according to claim 1, wherein the electrolytic solution contains 12 to 40 weight percent of the carboxylic ester to all solvents in the electrolyte solution.

4. The electrolytic solution according to claim 1, wherein the quaternary ammonium salt is at least one selected from the group consisting of a type of tetraalkylammonium salt having at least two different alkyl groups and a type of cyclic quaternary ammonium salt.

5. The electrolytic solution according to claim 1, wherein the quaternary ammonium salt is a tetrafluoroborate.

6. An electric double layer capacitor comprising:
   a pair of electrodes; and
   the electrolytic solution according to claim 1 which is present between the electrodes;
   said electrodes being made of an alkali-activated carbon prepared from a graphitic material.

* * * * *